United States Patent Office 3,583,932
Patented June 8, 1971

3,583,932
WATER BASED COATINGS
Richard E. Benton, Alliance, and Jack T. Perrin, Cuyahoga Falls, Ohio, assignors to The General Tire & Rubber Company, Akron, Ohio
No Drawing. Filed Apr. 5, 1968, Ser. No. 719,233
Int. Cl. C08f 15/40, 45/14
U.S. Cl. 260—8         7 Claims

ABSTRACT OF THE DISCLOSURE

This invention comprises a composition for producing strippable coatings comprising (A) a carboxylated polymer, (B) a protein and/or starch thickening agent, (C) an optional powdery release agent, and (D) water.

BACKGROUND OF THE INVENTION

Attempts have been made in the past to produce strippable paint-like compositions which can be brushed or sprayed onto a surface of a substrate and which dry to a film which can be subsequently removed by simply peeling the film from the surface. Such films are useful both as protective coatings and as stenciling films.

For suitable protective coatings the film-forming compositions must not attack the substrate surface being coated nor be adversely affected by any exposed components. In addition, the strippable film coatings must permit easy separation from the surface when desired but must otherwise have good adhesion to the substrate surface. Compositions employed heretofore as temporary protective coatings, for example, on plastic and painted surfaces have proved to be unsatisfactory in some applications due, for example, to such factors as water solubility, susceptibility to solvent attack or simply high cost. Therefore, attempts have been made to formulate new coatings of improved quality and lower cost.

For stenciling a given surface, such as wood, metal, plastic or paint surface, the surface is sprayed with a film-forming strippable composition which is then dried; the desired pattern is cut in the film coating; and the unwanted portions of the film are stripped from the substrate surface. Then, typically, the stripped surface portions are coated with a suitable ink or paint. After the desired pattern is fixed on the surface to be stenciled, the remainder of the strippable film is then removed.

One type of paint commonly used with strippable stencil patterns prepared as described is the acrylic type of paint. Unfortunately, this type of paint employs certain solvents, such as toluene and butyl lactate, which attack most compositions heretofore employed in the preparation of strippable films or which attack the bond between the strippable film and the coated surface. Consequently, attempts have been made to formulate new coating compositions which withstand both types of attack.

It is an object of this invention to provide a new waterborne composition which can be used to make protective coatings for the surfaces of wood, glass, plastic, metal and the like and painted surfaces as well.

Another object is to provide a resilient tough coating suitable for protecting a substrate surface against scratching and marring during packaging and shipping.

Another object is to provide such a coating which can be easily stripped from a substrate surface when desired.

Another object is to provide such a coating which not only resists solvent attack but which provides a solvent-resistant bond to the substrate surface.

Another object is to provide such a coating which, after being stripped from a surface, can be readily readhered to that surface.

These objects together with others which are apparent from the following description are satisfied by the present invention.

This invention comprises an aqueous dispersion comprising:

(A) 100 parts by weight of one or more essentially linear polymers containing sufficient pendant carboxyl groups to be at least alkali swellable;
(B) from 1 to 40 parts by weight of a protein and/or starch thickening agent;
(C) up to 110 parts by weight of an inert inorganic powdery release agent; and
(D) water in an amount sufficient to limit the total solids content of the dispersion to the range of about 10 to 50 percent by weight.

The polymers employed in the aqueous dispersion of this invention are copolymers of conjugated diolefins with olefins, preferably monoolefins, including some unsaturated aliphatic carboxylic acid. The conjugated diolefins generally contain from 4 to 8 carbon atoms and include, ufor example, 1,3-butadiene, isoprene, chloroprene, 2-methoxy-1,3-butadiene, 2-ethoxy-1,3-butadiene, 2-cyano-1,3-butadiene, 2,3-dimethyl-1,3-butadiene, piperylene and 2-methyl-1,3-pentadiene. The conjugated diolefins are the largest single class of monomers employed in the preparation of the subject copolymers and can be employed in amounts equal to from about 50 to about 75 weight percent of the monomer mixture. However, it is preferable that the conjugated diolefins are employed in amounts ranging from about 55 to 70 weight percent of the monomer mixture. Butadiene is particularly useful in that it is readily available, can be readily copolymerized with a large number of other monomers and imparts flexibility to the polymer.

In addition to the conjugated diolefins the monomer combination for preparation of the subject copolymer must include some olefinic monomers containing at least one carboxyl group per molecule. Specific examples of such unsaturated aliphatic carboxylic acids include acrylic acid, methacrylic acid, maleic acid, fumaric acid and itaconic acid. When two or more carboxyl groups are present, the anhydride form of the acid, such as maleic and/or fumaric anhydride, may be used. Alternatively, partial esters of unsaturated polycarboxylic acids, such as monomethyl maleate and monoethyl fumarate, or other partially reacted polycarboxylic acids can be used. Such carboxylated monomers can be present in an amount equal to as much as 30 weight percent of the monomer mixture, but it is preferred that this monomer component amounts to from about 5 to 20 weight percent of the monomer mixture. The preferred unsaturated carboxylic acids contain no more than about six carbon atoms. These acids may be used singly or in combination with one another.

In addition to the above monomers other olefin monomers can be employed in the preparation of the polymers employed in this invention including but are not limited to, for example, acrylonitrile, methacrylonitrile, ethacrylonitrile, styrene, alpha-methyl styrene, alpha-chlorostyrene, vinyl naphthalene, vinyl toluene and 2,4-dichloro styrene.

The monovinyl alphatic compounds are preferably employed in amounts ranging from about 5 to 15 weight percent of the monomer mixture. Because of the desired properties it imparts to the finished polymer acrylonitrile is a particularly desirable monovinyl aliphatic monomer. The monovinyl aromatic compounds, either substituted or unsubstituted, impart to the coating increased hardness and thermoplasticity and preferably are employed in amounts ranging from about 3 to 10 weight percent of the monomer mixture.

The monomers are preferably polymerized using an emulsion system such as that described in "Vinyl and Related Polymers," C. E. Schildknecht, John Wiley & Sons, 1952.

The polymer which has been found most desirable for use in the present invention is a copolymer derived from butadiene, styrene, acrylonitrile and methacrylic acid. Other vinyl monomers may be copolymerized with alpha-unsaturated, carboxyl-containing materials to effect the same results.

The aforementioned and described carboxylated copolymer is blended with a thickening agent and, optionally, a release agent in an aqueous medium to form a dispersion which, when cast as a film coating and dried, gives a continuous film of good integrity and strength.

The materials which are employed as thickening agents in this invention are proteins, particularly casein, and/or starches. The proportions of thickening agent to polymer range upward from about 1 part by weight of thickening agent per 100 parts of copolymer. As a practical matter no more than 40 parts of thickening agent per 100 parts of copolymer are used.

To facilitate stripping the coating to powdery inert release agent can be incorporated into the coating composition. Examples of suitable release agents include calcium carbonate, hydrated silica, $TiO_2$ and talc. The preferred release agent is calcium carbonate, preferably ground calcium carbonate having an average particle size of about 5 microns. Up to 110 parts by weight of release agent per 100 jarts of copolymer can be used.

The relative amounts of copolymer, protein, starch and release agent depend on such variables as the copolymer composition, the desired solids content of the coating dispersion, the desired viscosity of said dispersion, the expected use of the ultimate coating, e.g., for protective or stencil use, and the desirability of such characteristics as strippability and restickability of the ultimate coating. For example, coatings can be made from aqueous dispersions of copolymer and a protein such as casein, copolymer and a starch such as an ethylated corn starch or a corn-dextrin starch, copolymer and a combination of protein and starch and copolymer and protein and release agent.

Combinations of copolymer and starch alone have been prepared and have provided strippable coatings using in the range of about 10 to 25 parts by weight of starch per 100 parts of copolymer. However, starch introduced problems of excessive viscosity and gelation in such simple combinations in dispersions having total solids content of 20 weight percent or more. Such dispersions consequently have poor shelf stability.

The use of a protein such as casein in combination with a copolymer and a starch has been successful in strippable coatings, especially in amounts of 1 to 10 parts by weight of protein per 100 parts of copolymer. When a protein is included, the amount of starch can be reduced, including complete elimination, thereby making possible dispersions containing from 20 to 30 or more weight percent solids, but complete elimination of the starch from this three component combination impairs strippability of the ultimate coating.

Substitution of an inert powdery release agent for some or all of the starch in a copolymer-protein-starch system has made possible satisfactory coating dispersions containing as much as 50 or more weight percent solids. The release agent appears to be somewhat less efficient than a starch in imparting the property of strippability to the ultimate coating, but larger amounts of release agent can be employed without adversely affecting the dispersion viscosity as the starch does. It is possible to replace all the starch with a release agent, thereby improving the shelf stability of the dispersion. The inclusion of bactericides augments this improvement in shelf stability.

When the starch is completely replaced by a release agent as described, the amount of release agent can range from nothing to 110 parts by weight or more per 100 parts of copolymer. However, in such a system as the amount of release agent increases beyond a certain point, i.e., about 25 parts by weight of release agent per 100 parts of coplymer, the restickability of the ultimate coating decreases to the point of being unsatisfactory. Consequently, the preferred amount of release agent ranges from about 10 to about 35 parts by weight per 100 parts of copolymer, especially in the absence of starch. Copolymer-protein-release agent coatings containing this quantity range of release agent have both reasonable strippability and reasonable restickability. In such systems, the amount of protein is preferably kept in the range of about 1 to about 4 parts by weight per 100 parts of copolymer. Such coating dispersions containing less than 1 part by weight per 100 parts of copolymer produce coatings which are not readily reproducible and are unsatisfactory, especially with regard to strippability.

Blending of the polymer, release agent, protein and/or starch is done by any of the usual methods, and the order of mixing is optional. For example, the release agent, if any, can be mixed with the protein and/or starch before adding the polymer or the release agent can be combined with the polymer first. It is simplest to disperse all the ingredients in water prior to mixing them because the composition of this invention is an aqueous dispersion.

The aqeuous dispersion from which the desired strippable coating is derived can be applied to a substrate surface by any of the common means including brushing, spraying or dipping. The exact amount of water depends on the mode of application to be made and the type of coating desired. Preferably, the aqueous dispersion should have a total solids content of about 35 to 45 weight percent, the term solids including all components but the water. However, if the coating dispersion is to be sprayed on the substrate surface, it may be desirable to reduce the solids content to about 20 weight percent or less, especially when no release agent is present. For purposes of shipment the solids content can be as high as about 50 weight percent. The amount of water should be such that the total solids content is in the range of from about 10 to about 50 percent by weight.

Pigments, dyes, additional thickeners, bactericides and other common additives can be incorporated into the compositions of this invention. Similarly, such bases as potassium hydroxide, ammonium hydroxide or morpholine can be added to raise the pH of the dispersion above 7, for example, to the range of 7.8 to 8.0. However, care must be taken to avoid undesirable side effects such as shortened pot life of the resulting dispersion or unsatisfactory adhesion of the resulting film to the substrate surface.

The aqueous dispersions of this invention can be applied to any desired substrate surface which is not sensitive to water. Typical surfaces are painted surfaces, metal surfaces, wood surfaces and plastic surfaces including polymethylmethacrylate known generally as plexiglass. After the dispersion is applied to the substrate surface, the water is vaporized, preferably under normal atmospheric conditions at from about 15 to 40° C., leaving a film coating. A multiple layer coating can be achieved by allowing each film layer to dry partially or completely between dispersion applications.

In order to remove the dry coating, it is desirable to provide a release tab, which may be conveniently pulled in order to strip the film coating from the substrate surface. Because of excellent interfacial adhesion, the released portion can be restuck, if accidentally lifted.

The following examples illustrate the practice of the invention, but are not to be construed as limiting the scope thereof. All quantitative measurements are based on weight unless otherwise noted. Also, unless the text shows otherwise, the terms "polymer," "copolymer" and "terpolymer" are used synonymously.

EXAMPLE I

A polymer was prepared in a stirred autoclave using the following procedure:

One and one-half parts of an emulsifier (dihexyl ester of sodium sulfosuccinic acid) were dissolved in 146 parts of water. This solution was then charged to the autoclave and agitation begun.

Next, 20 parts of glacial methacrylic acid, and 10 parts of acrylonitrile were added to the reactor, which was then flushed with nitrogen. Thereafter, 64 parts of butadiene were added, and the mass was heated until a temperature of 47.2° C. was reached.

At 47.2° C. a previously prepared solution of 6 parts styrene and 3 parts of a chain modifier (5-dodecyl mercaptan) was charged to the reactor followed by a solution of 0.3 part ammonium persulfate in 2 parts water. Polymerization was conducted at 47.2° C. with constant stirring until a 50% conversion of monomer to polymer was attained, approximately 20% solids. At this point, the temperature was increased to 65.6° C.

At approximately 60% conversion, 0.5 part of dodecyl benzene sodium sulfonate dissolved in 2 parts of water was added to the reactor. At 75 conversion, the temperature was increased to 82.2° C. where it was held for two hours until conversion was substantially complete producing a copolymer having an average molecular weight above one million and composed of units derived from butadiene, styrene, acrylonitrile and methacrylic acid in the same proportion as the monomers reacted. The copolymer product was in the form of a latex containing about 41% copolymer solids.

The resulting latex was then stabilized by neutralizing the acid polymer with 2½% solution of ammonia to a pH of 7.5 to 8.0. Stripping was then conducted at a 65.6° C. temperature until the residual monomer content of the material was less than 0.05%.

The following mixtures were prepared using the above copolymer added as the latex described.

(A) A mixture of—

| Component: | Parts |
|---|---|
| Copolymer | 100 |
| Casein (added as a 15% solution of casein in water) | 14.6 |
| Water | 349 |

(B) A mixture of—

| Component: | Parts |
|---|---|
| Copolymer | 100 |
| Starch (an ethylated corn starch added as a 20% dispersion in water) | 19.5 |
| Water | 1015 |

(C) A mixture of—

| Component: | Parts |
|---|---|
| Copolymer | 100 |
| Casein (added as a 15% solution of casein in water) | 14.6 |
| Starch (an ethylated corn starch added as a 20% dispersion in water) | 19.5 |
| Water | 1078 |

(D) A mixture of the components in (C) but in the following proportions.

| Component: | Parts |
|---|---|
| Copolymer | 100 |
| Casein | 7.5 |
| Starch | 10 |
| Water | 475.5 |

Coatings of the resulting aqueous emulsions were applied to polymethyl methacrylate resin sheets and allowed to dry. After drying the coatings were stripped from the resin sheets.

All of the resulting coatings had good adhesive properties but were easily stripped from the sheets with no deleterious effect to the sheet itself.

EXAMPLE II

Another strippable coating was formulated as follows:

Solution A was prepared by mixing 356.3 parts of water, 16.4 parts of a corn-dextrin starch and 0.3 part of a phenyl mercuric acetate latex bactericide. The mixture was cooked at 180° C. until the starch was solubilized. Then 136.7 parts of a 15% casein solution was added to complete Solution A.

Solution B was prepared by mixing 288.1 parts of water, 5.9 parts of potassium hydroxide and 0.3 part of a phenyl mercuric acetate latex bactericide. The mixture was added to 516.8 parts of a latex containing 40% of the copolymer of Example I.

Solution A was added to Solution B, while agitating, to produce a solution containing copolymer, starch and casein in a calculated ratio of 100:7.9:9.9. The resulting mixture having a pH between 8.5 and 9.5 was applied to a plexiglass surface and after drying, showed excellent adhesive strength properties. When sprayed with paint containing toluene and butyl-lactate, there was no softening or lifting of the film, but the film could be easily stripped mechanically from the substrate surface.

EXAMPLE III

Another coating composition was formulated as follows.

| Component: | Parts |
|---|---|
| Water | 545.4 |
| Latex bactericide (ethylbenzyl dimethyl alkyl ammonium cyclohexylsulfamate) | 0.2 |
| Casein (added as a 50% aqueous solution) | 6.0 |
| Calcium carbonate (5 micron) | 90.0 |
| Dye | 0.5 |
| Copolymer of Example I (added as a 46.7% solids latex) | 259 |

The bactericide, casein solution and some additional water were charged to a vessel and agitated until the dispersion was uniform. After agitation, the calcium carbonate was added, and the dispersion was again mixed until uniform. The copolymer latex was then added, the water in the latex representing the balance of the total water. Next, dye was added, and the entire batch mixed until a uniform consistency was obtained. The resulting dispersion contained copolymer, casein and powdery release agent in a weight ratio of 100:2.3:34.7 and had a total solids content of 39.5%. Subsequently, the dispersion was passed through an 80-mesh filter and applied as a film coating to a plexiglass surface for use as a stencil. The coating showed excellent adhesion, cohesion, and strength properties. The coating was easily removed when dried and readily adhered to the plexiglass surface when reapplied in the dried state.

EXAMPLES IV to IX

A further series of copolymer latices was prepared as in Example I except that the amounts of reactants set out in Table I were used.

TABLE I

| Examples | IV | V | VI | VII | VIII | IX |
|---|---|---|---|---|---|---|
| Butadiene | 70 | 58 | 64 | | 64 | 58 |
| Isoprene | | | | 64 | | |
| Styrene | | 6 | 6 | 6 | 6 | |
| Methacrylic acid [1] | 20 | 26 | 17 | 20 | 17 | 20 |
| Acrylonitrile | 10 | 10 | 10 | 10 | 10 | 10 |
| Tertiary dodecylmercaptan | 3 | 3 | 3 | 3 | 3 | 3 |
| Fumaric acid | | | 3 | | | |
| Itaconic acid | | 3 | | | 3 | |
| Methyl methacrylate | | | 12 | | | 12 |

[1] Small amounts of monoesters of fumaric, maleic or itaconic acid may be used to replace part of the methacrylic acid.

When each of these latices is substituted mol for mol for the latex in the composition of Example III, satisfactory strippable, restickable coatings are produced.

EXAMPLE X

The experiment described in Example II was repeated except that the proportions of the ingredients were changed as follows.

| Component: | Parts |
|---|---|
| In Solution A— | |
| Water | 345.7 |
| Starch | 10.1 |
| Bactericide | 0.3 |
| 15% casein solution | 68.0 |
| In Solution B— | |
| Water | 352.1 |
| Potassium hydroxide | 7.2 |
| Bactericide | 0.3 |
| Latex (40% solids) | 631.3 |

A similar excellent strippable film was produced.

EXAMPLE XI

When a coating composition is prepared in accordance with Example III except that 303 parts of the calcium carbonate and 10.1 parts of the casein are employed and said composition is applied as a film coating to a plexiglass surface and is dried, the resulting film has good adhesion but can be easily stripped from the surface.

EXAMPLE XII

Coating compositions were prepared in accordance with Example III but varying the amount of the calcium carbonate to determine its effect on strippability and restickability of the resulting films with the following qualitative results:

TABLE II

| Run | Parts of calcium Carbonate per 100 parts of copolymer | Strippability | Restickability |
|---|---|---|---|
| (E) | 0 | Poor | Good. |
| (F) | 11.7 | Fair | Do. |
| (G) | 15.6 | do | Do. |
| (H) | 23.4 | Good | Do. |
| (J) | 31.1 | do | Fair. |
| (K) | 35.0 | do | Do. |
| (L) | 38.9 | do | Poor. |
| (M) | 42.8 | do | Do. |
| (N) | 46.7 | do | Do. |

EXAMPLE XIII

When calcium carbonate samples having average particle sizes of 2.5 microns, 0.1 micron and 0.06 micron are each substituted for the calcium carbonate in Run (H) in Example XII, the strippability and restickability of the resulting films are fair instead of good.

When a precipitated hydrated silica having an average particle size of 0.1 micron is substituted for the calcium carbonate in Run (H) in Example XII, the resulting film has fair strippability.

EXAMPLE XIV

Coating compositions were prepared in accordance with Run (H) in Example XII but varying the amount of casein to determine its effect on strippability and restickability of the resulting films with the following qualitative results:

TABLE III

| Run | Parts of casein per 100 parts of copolymer | Strippability | Restickability |
|---|---|---|---|
| (O) | 1.8 | Poor | Good. |
| (P) | 2.3 | Good | Do. |
| (Q) | 2.9 | do | Poor. |

What is claimed is:
1. A composition suitable for the preparation of a flexible strippable coating consisting essentially of a uniform aqueous dispersion consisting essentially of:
 (A) 100 parts by weight of a copolymer of a monomer mixture consisting essentially of:
   (a) from 50 to 75 weight percent of conjugated diolefins containing from 4 to 8 carbon atoms and
   (b) from 5 to 30 weight percent of unsaturated aliphatic carboxylic acids and, optionally,
   (c) up to 15 weight percent of different monovinyl aliphatic compounds and
   (d) up to 10 weight percent of different monovinyl aromatic compounds;
 (B) from 1–40 parts by weight of a thickening agent selected from the group consisting of 0 to 25 parts by weight of starch and 0 to 20 parts by weight of a protein:
 (C) up to 110 parts by weight of an inert inorganic powdery release agent; and
 (D) water in amount sufficient to limit the total solids content of said dispersion to the range of from about 10 to about 50 percent by weight.

2. A composition of claim 1 wherein the protein in component (B) is casein and the component (C) is calcium carbonate.

3. A composition of claim 1 wherein the dispersion has a pH above 7.

4. A composition of claim 2 wherein component (B) is free of starch.

5. The method of preparing a flexible strippable coating on a substrate surface comprising
 (1) applying as a film to said surface a uniform aqueous dispersion consisting essentially of:
   (A) 100 parts by weight of a copolymer of a monomer mixture consisting essentially of:
     (a) from 50 to 75 weight percent of conjugated diolefins containing from 4 to 8 carbon atoms and
     (b) from 5 to 30 weight percent of unsaturated aliphatic carboxylic acids and, optionally,
     (c) up to 15 weight percent of different monovinyl aliphatic compounds and
     (d) up to 10 weight percent of different monovinyl aromatic compounds;
   (B) from 1 to 40 parts by weight of a thickening agent selected from the group consisting of 0 to 25 parts by weight of starch and 0 to 20 parts by weight of a protein:
   (C) up to 110 parts by weight of an inert inorganic powdery release agent; and
   (D) water in amount sufficient to limit the total solids content of said dispersion to the range of from about 10 to 50 percent by weight; and
 (2) drying said film.

6. A strippable coating composition consisting essentially of a mixture of:
 (A) 100 parts by weight of a copolymer of a monomer mixture consisting essentially of:
   (a) from 50 to 75 weight percent of conjugated diolefins containing from 4 to 8 carbon atoms and
   (b) from 5 to 30 weight percent of unsaturated aliphatic carboxylic acids and, optionally,
   (c) up to 15 weight percent of different monovinyl alphatic compounds and
   (d) up to 10 weight percent of different monovinyl aromatic compounds;
 (B) from 1 to 40 parts by weight of a thickening agent selected form the group consisting of 0 to 25 parts by weight of starch and 0 to 20 parts by weight of a protein; and (C) up to 110 parts by weight of an inert inorganic powdery release agent.

7. An article of manufacture at least one surface of which is coated with a strippable coating composition consisting essentially of a uniform mixture of:
- (A) 100 parts by weight of a copolymer of a monomer mixture consisting essentially of:
  - (a) from 50 to 75 weight percent of conjugated diolefins containing from 4 to 8 carbon atoms and
  - (b) from 5 to 30 weight percent of unsaturated aliphatic carboxylic acids and, optionally,
  - (c) up to 15 weight percent of different monovinyl aliphatic compounds and
  - (d) up to 10 weight percent of different monovinyl aromatic compounds;
- (B) from 1–40 parts by weight of a thickening agent selected from the group consisting of 0 to 25 parts by weight of starch and 0 to 20 parts by weight of a protein; and
- (C) up to 110 parts by weight of an inert inorganic powdery release agent.

References Cited
UNITED STATES PATENTS

| | | | |
|---|---|---|---|
| 2,611,153 | 9/1952 | Semegen | 117—6 |
| 3,392,048 | 7/1968 | Rolik | 260—8 |
| 2,885,374 | 5/1959 | Sweeney | 260—29.6 |
| 3,345,206 | 10/1967 | Kordman | 117—161 |
| 3,409,569 | 11/1968 | Lane et al. | 260—8 |

WILLIAM H. SHORT, Primary Examiner

E. WOODBERRY, Assistant Examiner

U.S. Cl. X.R.

117—6; 38, 124; 127, 138.8; 148; 260—17.4